United States Patent [19]
Cogliano

[11] Patent Number: 4,464,215
[45] Date of Patent: Aug. 7, 1984

[54] PROCESS OF APPLYING A UNITARY CONSTRUCTION BARRIER

[75] Inventor: Joseph A. Cogliano, Pasadena, Md.

[73] Assignee: W. R. Grace & Co., New York, N.Y.

[21] Appl. No.: 402,749

[22] Filed: Jul. 28, 1982

[51] Int. Cl.³ .............................................. E04B 2/00
[52] U.S. Cl. ..................................... 156/71; 52/309.8; 52/746; 52/747; 156/249; 156/299; 156/304.3; 156/306.6; 156/337; 428/40; 428/317.3; 428/317.7
[58] Field of Search ................. 156/71, 299, 249, 337, 156/306.6, 304.3; 52/309.8, 746, 747; 428/40, 317.3, 317.7

[56] References Cited

U.S. PATENT DOCUMENTS

| 3,111,787 | 11/1963 | Chamberlain | 156/337 |
| 3,121,649 | 2/1964 | Oliver | 156/71 |
| 4,021,981 | 5/1977 | Van Wagoner | 156/71 |

FOREIGN PATENT DOCUMENTS

| 252952 | 1/1961 | Australia | 428/317.7 |

Primary Examiner—John J. Gallagher
Attorney, Agent, or Firm—Howard J. Troffkin

[57] ABSTRACT

A process for forming an insulation/waterproofing or a water drainage enhancer/waterproofing barrier on a construction surface by applying directly to said surface a preformed unitary structure comprising a non-porous adhesive sheet like membrane having directly adhered to one surface thereof a cellular board.

11 Claims, 3 Drawing Figures

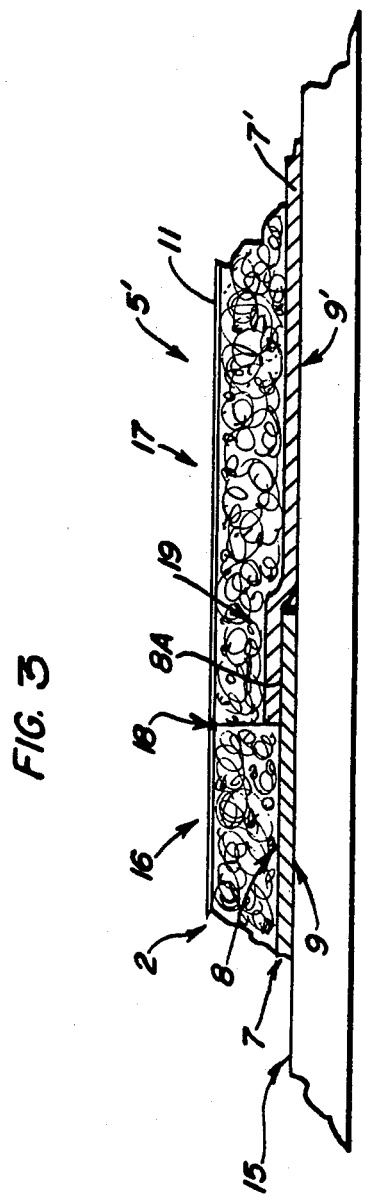

PROCESS OF APPLYING A UNITARY CONSTRUCTION BARRIER

BACKGROUND OF THE INVENTION

The present invention is directed to a process for forming a barrier structure useful in the construction industry. More specifically, the presently disclosed process forms an insulation/waterproofing barrier or in another embodiment, a water drainage enhancer/waterproofing barrier in a simple one step application.

Built up roofing has been employed for many years wherein a roof deck supports a membrane which prevents penetration of moisture. Such water impermeable membranes have been formed from conventional asphaltic and bituminous compositions, laminates of the asphaltic or bituminous material with fibrous products, such as roofing felt or from rubberized asphalt, synthetic polymeric compositions or by applying sheet waterproofing membranes such as formed from butyl, neoprene or a polymer film supported rubberized asphalt. Such materials are generally applied by mopping, etc., of multiple layers of the waterproofing material until a thick weather-resistant membrane is formed. Gravel or the like is normally used to cover the membrane to enhance its weathering ability. Further, the roof structure normally contains insulation to aid in maintaining constant and comfortable temperature within the structure. The insulation is conventionally installed below the roof deck on the interior of the building.

More recently, it has been found that installation of insulation on top of the exterior surface of the roof membrane has the advantages of maintaining the applied waterproofing membrane at a more constant temperature causing longer life of the membrane. Such roofing structures has been dubbed "upside down roofs". The conventional manner of forming an upside down roof entails first applying a waterproof roofing membrane, such as formed from asphalt or butuminous composition, allowing the applied composition to cool and permitting sufficient time for the asphalt to cure by the evaporation of volitiles. A mastic is then applied to the membrane by spraying or the like to cause adhesion and anchoring of the subsequently applied insulation. A protective layer is applied over the insulation and, finally, gravel or the like material is applied on top to further aid in anchoring and securing the structure.

Conventional asphaltic waterproofing membrane materials are not generally used in the installation of upside-down roof structures. Such membranes are weak, tender materials which are required to be in contact with a support sheet, such as a polyethylene sheet, to enhance the strength of the membrane and to protect it from puncture and the like damage. Such support sheets must be securely adhered to the membrane and, therefore, cannot be removed without tearing and destroying the sheet material. The support sheet, however, inhibits adhesion of any subsequent layer, such as that of a porous insulating material and the installer must, therefore, apply a strong mastic and an anchoring cover, such as gravel, etc., over the insulation material to maintain its position.

The upside-down roof structure has not met extensive acceptance in the industry even though it has the advantage of enhancing the durability and life of the waterproofing membrane by shielding the membrane from the environmental temperature changes it normally encounters. The lack of acceptance is mainly due to the extensive time required for installation, the care required by the installers, the various materials required at the job sight and the extensive amount of man hours required to produce the formation.

Barrier protection is also used on vertical surfaces, such as foundation walls, by parging the foundation's exterior surface with a waterproofing paint or cement or an asphaltic composition. This must be carefully done to assure that it fully covers the foundation surface and does not leave gaps which would permit water seepage through the foundation wall. When drainage enhancement is desired, this is normally accomplished by placing drainage tile or pipe at the foundation footing and installing gravel or the like over the tile and against the parged foundation wall during backfill. Formation of such a barrier is labor intensive, requires use of heavy material and, therefore, heavy equipment, and the installation of the gravel tends to chip and break the formed waterproofing membrane.

It is desired to have a process and a material capable of forming a thermal/moisture barrier which can be applied with minimum amount of labor and time. It is also desired to have a process and a material capable of forming a drainage/moisture enhancing means which can be easily applied with minimum amount of labor and time.

SUMMARY OF THE INVENTION

The present invention is directed to a process of forming a barrier structure useful in the construction industry and the like. The present process is capable, in one embodiment, of forming a thermal/moisture barrier and, in a second embodiment, of forming a moisture barrier/drainage enhancing means. The subject process requires a minimum amount of labor and time to form the desired barrier.

Specifically, the instant invention uses preformed barrier structure composed of a porous, substantially planar board having a closed-pore (for insulation) or open-pore (for drainage) structure, and having a first and a second major face and having edges defining the dimensions of said sheet-like structure. In contact with and self-adhered to substantially the entire first major face of the porous structure is an adhesive bituminous sheet material. It is preferred that the bituminous sheet material be of a dimension such that at least two of said membrane edges extend beyond the edges of the porous board.

BRIEF DESCRIPTION OF DRAWINGS

FIG. 3 is a cross-section view of the barrier as applied to a structural surface.

DETAILED DESCRIPTION OF THE INVENTION

Figure 1:
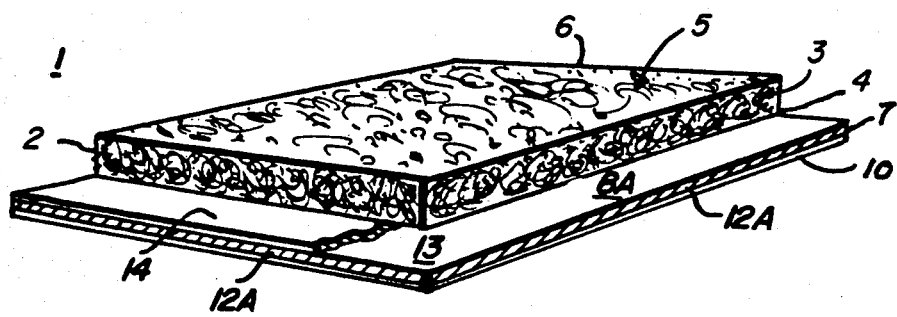
FIG. 1 is an oblique view of a barrier with extended adhesive membrane used in the present process.
Figure 2:
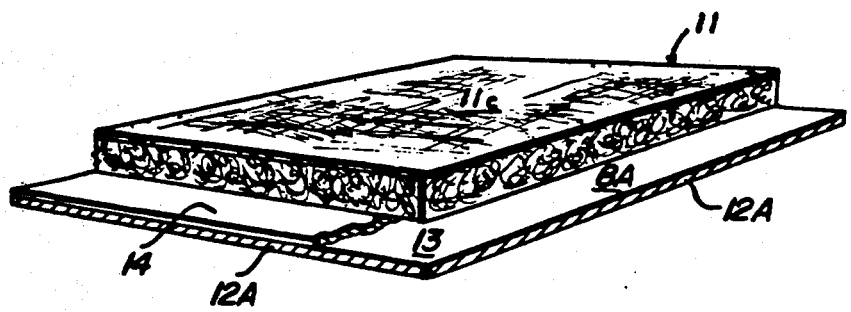
FIG. 2 is an oblique view of a second embodiment of a barrier used in the present process.

The subject invention is directed to a process of applying a composite structure to readily form a barrier for use in the construction industry. The composite barrier structure (1) comprises a porous, open or closed cell (3), substantially planar member (2) having a first (4) and a second (5) major surface and edges (6) defining its dimensions and an adhesive bituminous sheet, material which has a first (8) and a second (9) major surface and edges (12) defining its dimensions and which is at least coextensive and congruent with that of the porous board as fully described in my concurrently filed, copending applications U.S. Ser. No. 402,747 and U.S. Ser. No. 402,748 which teachings are incorporated herein by reference.

The porous structure suitable for use in the instant invention is a substantially rigid, substantially planar sheet-like structure having a plurality of pores therein. The term "rigid" shall mean a material which has a limited amount of flexibility and shall apply to structures which may be bent to small degrees by the application of force. The specific amount of flexure will depend upon the dimensions of the structure. It is preferred that the porous structural member (hereinafter called a "porous board") be capable of retaining its planar configuration with respect to its major faces. The planar configuration of the porous board will permit the ultimately formed barrier of this invention to be placed on and secured, as described below, to planar structural members, sucn as a roof deck or foundation walls. In certain instances, it may be desired to have the rigid porous board in certain predetermined nonplanar configuration which conforms to the configuration of the structural surface to which it will be ultimately applied.

The porous board can be formed from any conventional material forming an open cell structure. Open cellular material comprises materials having interconnected cells throughout the board and which, thereby, form tortuous paths from surface to surface throughout. Such open cellular material are cellular polymeric foams including those formed from polyurethane, urea formaldehyde, phenol-formaldehyde, polystyrene foam containing interconnecting voids and the like. Porous board of an open cellular configuration can also be in the form of rigid fiberglass batting.

When the barrier used in the instant invention is formed with an open cellular board, the resultant barrier is usually applied to foundation walls and the like as a combined waterproofing/drainage enhancing means. The barrier is adhered to the foundation wall by contacting the free major surface of the adhesive sheet component, as more fully described below, to the wall. The open cell porous board is then on the free side of barrier and will be adjacent to the backfill surrounding the foundation. Normally, the barrier is applied over an area of the foundation from its bottom to an area close to the estimated level of the surface of the backfill. Conventional drainage tile or pipe can be located below the applied barrier, at the footing of the foundation to carry the water away. The present barrier formed from a porous board causes water impermeability via the formed adhesive bituminous membrane and permits ready movement and removal of any water concentrating at the foundation via the porous board structure to reduce and prevent hydrostatic pressure build up.

When the subject barrier is formed of an open cellular board for use as a drainage enhancing means, it is preferred that the free surface of the board have a fibrous cloth (11) adhered to the surface to inhibit plugging of the pores by foreign matter. The cloth should be formed of a stable, durable material such as of synthetic polymeric fibers.

Alternately, the barrier used in the instant invention can have a porous board formed from any conventional closed cellular material. Closed cellular material comprises materials have discrete pore cells throughout the board. This type of board is water impermeable and, due to the dead air pockets of the pores, forms an effective insulation material. Closed cellular boards can be formed from a variety of materials as well known in the art, such as styrene polymer foams, styrene-acrylonitrile copolymer foams, styrene methylmethacrylate copolymer foams, polyurethane foams, asphaltic compositions, such as polymer (as, for example, styrene, ethylene-acrylate copolymer, ethylene-vinyl acetate, and the like) modified asphaltic foams and the like and foamed glass.

The closed cell structure is generally formed by supporting the material in its plastic state by external pressure during the formation of the gas bubbles and until the material becomes sufficiently rigid to retain the gas in the cell formed. Such structures can also be conventionally formed by extrusion of a polymeric material containing a blowing agent, such as a fluorinated hydrocarbon or a lower alkane. Upon egress from the extruder the material expands due to decompression and the vaporized blowing agent is entrapped in the solidified product.

When the closed cell porous board is used as a component of the barrier to be applied according to the present invention, one forms an insulation/water proofing barrier which can be readily applied to roof decks to form an upside-down type of roof construction. This barrier can also be applied to vertical walls, such as foundation walls and exterior walls to provide a one step installation of waterproofing and insulation.

The porous board may be of any desired shape. It is preferred that the board configuration (which controls the configuration of the barrier) is of a quadrilateral parallelogram, such as a rectangle or square. The dimensions can be any convenient for the construction industry or for the particular application such as boards which are from about 1 to 6 feet (preferably from 2 to 4 feet) wide or more and from 1 to 12 feet (preferably from 2 to 10 feet) long or more. The thickness of the board can vary from about 0.25 to 10 inches (preferably from about 0.5 to 4 inches). The barrier used in the present process is formed from substantially light materials and can, therefore, be of large dimensions to cover, in one step, a large expanse of structural surface.

A preformed non-porous adhesive sheet is directly adhered to the porous board. The adhesive sheet is described herein in terms of the preferred material, an adhesive bituminous membrane. The adhesive bituminous membrane can be formed from any bituminous composition which has adhesive properties at least with respect to each of its major surfaces. Bituminous (The term "bituminous" and "bituminous composition" is used in this specification and appended claims to define compositions formed from a bitumen, asphalt, tar or pitch base.) sheet materials which have adhesive properties are known and are formed from blends of bituminous material and a natural or/and synthetic rubber or resin. These blends can be formed with a natural or synthetic rubber which is virgin or reclaimed to provide a smooth mix. The synthetic rubber can be, for example, styrene-butadiene rubber (SBR), acrylonitrile-butadiene rubber (NBR), chloroprene rubber (CR), isoprene rubber (IR), butyl rubber (IIR), and the like. The ratio by weight of bituminous material to rubber is generally from about 80:20 up to about 95:5 and preferably from about 85:15 to 95:5. Generally, suitable compositions have a softening point (Ring and Ball method) of 60° to 140° C. and preferably 60° to 110° C. and a penetration value of 50 to 400, preferably 150 to 300 at 25° C. (100 g. 5 sec. - I.P. method).

The preformed adhesive bituminous sheet suitable for use in the present invention can have a laminate structure formed from a multiple of layers of bituminous compositions provided that the laminae forming each of the major surfaces of the sheet is formed of an adhesive bituminous composition. Further, the adhesive bituminous sheet formed from a single or multiple layers, as described above, can have embedded therein a web or cloth formed from a woven or non-woven organic or inorganic, natural or synthetic fibers (staple or continuous filament) such as glass, hessian, cotton, or synthetic polymers, polyolefins, polyamides, polyesters (polyethylene terephthalate), polyurethane and the like. The web or fibrous cloth should be of a thickness not greater than about half, preferably less than one quarter the thickness of the bituminous sheet material.

The preformed sheet should be at least 0.01 inch (0.025 cm) thick, preferably 0.025 to 0.2 inch (0.063 to 0.5 cm). The thicker the sheet the better the waterproofing effect but, in general, a sheet of from 0.025 to 0.15 inch (0.063 to 0.4 cm) thick is satisfactory for most application.

The adhesive sheet has a first and a second major surface and edges which define its dimensions. The sheet's first major surface is superimposed on and at least coextensive with the first major surface of the porous board. The sheet is in direct contact with the porous board and the adhesive properties of the first major surface of the sheet causes the composite to be a unitary structure.

The barrier can be stored, transported and sold with a coating (10) which is coextensive and congruent with the second major surface of the adhesive sheet to aid in handling. This surface will, upon removal of the protective coating at the construction site, be applied to the structural surface to be sealed. The protective coating can be in the form of siliconized paper, cloth, polymer film or the like sheet product treated with a release agent so that it is substantially non-adherent with respect to the adhesive sheet's second major surface ("substantially non-adherent" means herein and in the appended claims to be readily removable from the adhesive sheet's surface without causing substantial damage). The release agent used in conjunction with the coating sheet can be any commercial release agent such as a dispersion of silicon compound, for example, a dispersion of poly(dimethyl siloxane).

The subject barrier can, alternately, be transported and sold with a coating of a film (11c) (normally up to about 5 mils thick) of a release agent on the free surface of the board or on the board/cloth combination, if used. The second major surface of the adhesive sheet is ready for application to the construction surface without requiring removal and disposal of the protective sheet coating, as described above. The barrier is stored, transported and sold by stacking the barriers so that the adhesive sheet of one barrier is coextensive and congruent with the release coating on the board's free surface of another barrier which, in turn, is coextensive and congruent to still another barrier in the same manner. The bottom element of the stack should be a release coating treated board or the like without an adhesive membrane. The barrier can be directly removed from the storage stack and applied to the structural surface.

The sheet has dimensions of length and breath defined by the edges of the sheet. The sheet may be of a dimension such that it is coextensive and congruent with that of the porous board with which it forms a composite barrier.

In another embodiment, the sheet has dimensions such that it covers all of one surface of the porous board and extends, with respect to at least two edges (12c), beyond that of the coordinate (spacially close and substantially parallel) edges of the porous board. In this manner the sheet shall have an overhang with respect to at least two edges and thus provide a means for overlapping at the junctures of the applied barriers over the entire expanse of the structural surface. The two extended edges of the sheet of any one barrier can be adjacent edges, that is edges which meet at one corner area (13) of the barrier. Alternately, the extended edges can be parallel to each other (for example, on opposite sides of a quadrilateral parallelogram) or the sheet's edges can extend on all sides with respect to the porous board of the barrier.

The extended portions of a bituminous sheet of any one barrier will have the associated extended portion (8A) of its first major surface exposed. To aid in handling during storage, transportation, etc. this exposed portion of the first major surface should be covered with a coating (14) similar to that described above with respect to the coating for the sheet's second major surface. The coating should be treated with a agent, as described above, to permit its ready removal. This release agent should, preferably, impart non-adherent properties to a lesser degree in comparision to that used on the protective coating for the membrane's second major surface. Such agent could be, for example, a modified poly(dimethyl siloxane) having a fraction of the methyl groups replaced by hydrogen, a higher alkyl or a phenyl group.

When the barrier is supplied with a protective coating as an integral part of the second major surface of the porous board or over the combination of surface and cloth and the barrier is of a configuration having extended portions of its bituminous sheet, the protective coating should also cover the edge surfaces of the board and should be on both surfaces of the coating sheet which covers the exposed portion of the first major surface of the bituminous sheet. In this manner the extended portion of the bituminous sheet can drape downwards over the edge surface and even (depending on its dimensions) of the protected surface of extended bituminous sheet of lower barriers in a stack of barriers during storage, etc. The extended free surface of the sheet component of any one barrier will only be in contact with a protective coating (i.e. a release agent coating) providing protection during storage, etc.

The bituminous sheet component of the barrier can extend beyond the porous board for about 1 to about 10 inches or more, preferably from 2 to 8 inches to permit overlapping with a sheet of the next applied subject barrier and to permit extended adhesive to adhesive contact to assure forming a secure watertight seal.

The application of the subject barrier can be readily done without the need for extensive labor or the use of extensive equipment and material as is normally required in applying a composite roof or wall structure.

When the barrier is supplied in the form of a bituminous sheet and porous board which are coextensive and congruent to each other, it is applied to the structural surface to be protected by removing the protective sheet coating (10), when so supplied, to expose the second major surface (9) of the adhesive bituminous sheet (7) of a barrier and positioning and applying the barrier to the structural surface so that the exposed second major surface of the adhesive sheet is in contact with the structural surface (15). The protective coating on the sheet of another barrier is then removed to expose the second major surface of its adhesive sheet. This barrier is positioned and applied to the structural surface adjacent to that of the previously applied barrier in a manner to have the bituminous sheet of the newly placed barrier adjacent to the porous board of a previously placed barrier. The steps are repeated until the entire surface is covered. The barriers are placed adjacent to and in contact with the barrier forming the prior layed course. Such placement of barriers formed of adhesive sheet and porous board which are coextensive permits and causes each of the edges of one barrier's sheet to butt up against an adjacent edge of the next barrier's sheet component. Due to the adhesive property of each sheet and their ability to flow to a small degree even under ambient temperatures, the abutting edges will self-adhere, form a water-tight seal and form a unitary structure over the entire structural surface to which it is applied.

The subject barrier which has two edges of its sheet component meeting at one corner area and extended beyond the porous board is applied to structural surfaces in the same manner as described above for the coextensive and congruent sheet/porous board barrier product. When so applied they form overlapping seams of the sheet product and, thereby assure formation of a waterproof unitary membrane. The barrier (2) is applied by removing the protective coating (10), again as applicable, from the second major surface (9) of the sheet of one barrier to expose the adhesive (7) surface, positioning and applying the barrier to the structural surface (15) so that the sheet's exposed second major surface (9) is in contact with the structural surface (15), and then removing the protective coating (14) from the extended first major surfaces (8A). One then applies a second barrier ($5^1$) by removing its protective coating from its sheet's second major surface ($9^1$), applying the second barrier to the exposed extended first major surface (8A) of the sheet of the first barrier and to the adjacent structural surface so that the porous board of the first and second barriers are adjacent to and in contact with each other at (18) and so that the sheet of the second barrier is adjacent to the porous board of the first barrier. The sheet components of the first and second barriers will thereby overlap. The protective coating of the extended portion of the first surface of the second barrier is removed. The process is repeated until the surface of the structure to be protected is covered. This provides an overlap seams between each applied barrier sheet component with extended adhesive to adhesive contact to assure waterproof seams.

The barrier of this embodiment can be applied to form a substantially flat total structure if, in a preferred manner, the porous board of the barrier has edge areas (19) (area extending for a short distance of about equal or greater than the extended width of the sheet component as, for example, from about 1 to about 10 inches relative to the porous board's edges which do not have extended sheet portions) wherein the second major surface of the porous board is substantially planar and the first and second major surfaces of the porous board are in closer spacial relationship at the edge portion than with respect to the remainder of the board. This will form an indenture (preferably about equal to the thickness of a sheet component of the barrier used) to accommodate the overlap of the two sheets.

The embodiment of the subject barrier described hereinabove wherein the sheet component of the barrier extends on opposite sides of the porous board and substantially parallel to each other or wherein it extends beyond the porous board on all sides is applied by first removing the protective coating from the second surface of the sheet component of a first barrier to be laid, positioning and applying the first barrier to the structural surface, removing the coating from the extended portion of the first major surface of the sheet of the first barrier, removing the protective coating from the adhesive sheet's second major surface of a second barrier, positioning and applying the second barrier so that one of its sheet's extended edges is adjacent to the porous board of the first barrier and the second barrier's sheet's second major surface covers at least a portion of the first surface of the extended sheet of the first barrier (to form an overlap seam) and the adjacent structure surface, removing the protective coating from the sheet's first major surface and repeating until the entire surface is covered. The exposed overlap seams can then be covered with filler sections formed from porous board of the same or similar type used to form the barrier. The filler sections should be of a thickness approximately equal to the thickness of the barrier less twice the thickness of the barrier's sheet component. Alternately, certain filler sections of any one barrier can be supplied as part of a barrier as temporarily adhered to half of the extended sheet surfaces. These sections thereby act as a guide to aid in applying the barrier to adjacent barriers of proper spacing. Each filler section can be removed to permit rolling of the overlap adhesive sheets to insure forming of a watertight seal there between and then replaced in the vacant space. The temporary adhesion of each filler section to the extended sheet can be done by applying a release film to the surface of the filler section initially in contact with the adhesive membrane and then reapplying the filler section with the release film treated surface away from the sheet membrane. Other methods can be readily determined by the artisan. The resultant structure will thereby be substantially flat.

While the subject invention has oeen described in terms of certain preferred embodiments thereof, it is to be understood that the subject invention is not limited thereto or thereby.

What is claimed is:
1. A process for forming a barrier construction on a structural surface comprising
    (A) transporting barriers to a structural surface to be covered, each of said barriers comprising
        (a) a porous, substantially planar structure having a first and a second major surface and edges defining the dimensions of the structure and said structure having a thickness of from about 0.25 inch to about 10 inches and
        (b) a non-porous bituminous adhesive sheet formed from blends of bituminous material and natural or synthetic rubber or resin, said sheet having a thickness of at least 0.01 inch, a first and a second major surface and edges defining the dimensions of said adhesive sheet, wherein two of the sheet edges extend beyond, are each substantially parallel to an edge of the porous structure, respectively, and are in contact with each other at one corner section of said barrier, and wherein the first major surface of said adhesive sheet is in contact with and self-adhered to the substantially entire first major surface of the porous structure; and (c) a first protective coating which is coextensive and congruent with the extended portion of the first major surface of the adhesive sheet and a second protective coating which is coextensive and congruent with the second major surface of the adhesive sheet, each of said coatings being removable from and substantially non-adherent to said adhesive sheet.

(B) removing the second protective coating from the second major surface of the adhesive sheet of a first barrier;

(C) positioning and applying the first barrier onto a structural surface to cause the adhesive sheet's second major surface to be in contact with a portion of the structural surface;

(D) removing the protective coating from the extended portion of the first major surface of the first barrier's adhesive sheet;

(E) removing the protective coating from a second major surface of the adhesive sheet of a second barrier;

(F) positioning and applying the second barrier onto the structural surface adjacent to that of a previously applied barrier in a manner such that a portion of the second major surface of the adhesive sheet of the second barrier is superimposed on a portion of the extended first surface of the adhesive sheet of the previously applied barrier and the second barrier's porous structure is adjacent to the previously applied barrier porous structure; and (G) repeating Steps (D), (E), and (F) until the structure surface is covered.

2. The process of claim 1 wherein each barrier has its porous structure and adhesive sheet substantially in the form of quadrilateral parallelograms, said second major surface of said porous structure is substantially planar, and said first major surface of said porous structure has edge areas which are coextensive with and extending from said remaining edges and said edge areas of the first major surface are in closer spacial relationship with the second major surface than the remaining portion of said first major surface of said porous structure.

3. The process of claim 2 wherein each of the applied barriers has extended adhesive sheet edges of from 1 to 10 inches beyond the edges of the barrier's porous structure and the edge portions of its porous structure extend from 1 to 10 inches from said remaining edges.

4. The process of claims 1 or 2 wherein the porous structure is formed of a closed pore structure.

5. The structure of claim 1 or 2 wherein the porous structure is formed of an open pore structure.

6. A process for forming a barrier construction on a structural surface comprising (A) transporting barriers to a structural surface to be covered, each of said barriers comprising (a) a porous substantially planar structure having a first and a second major surface and edges defining the dimensions of the structure, said structure having a thickness of from about 0.25 inch to about 10 inches;

(b) a non-porous adhesive sheet having a thickness of at least 0.01 inch, a first and a second major surface and edges defining the dimensions of said adhesive sheet, wherein two of said sheet edges extend beyond, are each substantially parallel to an edge of the porous sheet, respectively, and are in contact with each other at one corner section of said barrier, and wherein the first major surface of said adhesive sheet is in contact with and self adhered to the substantially entire first major surface of the porous structure, and (c) a first protective coating which is coextensive and congruent with the extended portion of the first major surface of the adhesive sheet, said coating being removable from and substantially non-adherent to said adhesive sheet, and a second protective coating which is a film which is substantially non-adherent to said adhesive sheet, said film coating substantially the entire second major surface of the porous structure, (B) positioning and applying the first barrier onto a structural surface to cause the adhesive sheet's second major surface to be contact with the structural surface;

(C) removing the first protective coating from the first extended portion of the first major surface of the adhesive sheet;

(D) positioning and applying the second barrier onto the structural surface adjacent to that of a previously applied barrier in a manner such that the porous board of the second barrier is adjacent to the porous board of the previously applied barrier and a portion of the adhesive sheet of the second barrier is superimposed on one extended portion of the adhesive sheet of the previously applied barrier; and (E) repeating Steps (C) and (D) until the structural surface is covered.

7. The process of claim 6 wherein each barrier has its porous structure and adhesive sheet substantially in the form of quadrilateral parallelograms, said second major surface of said porous structure is substantially planar, and said first major surface of said porous structure has edge areas which are coextensive with and extending from said remaining edges and said edge areas of the first major surface are in closer spacial relationship with the second major surface than the remaining portion of said first major surface of said porous structure.

8. The process of claim 7 wherein each of the applied barriers has extended adhesive sheet edges of from 1 to 10 inches beyond the edges of the barrier's porous structure and the edge portions of its porous structure extend from 1 to 10 inches from said remaining edges.

9. The process of claim 6 or 7 wherein the porous structure is formed of a closed pore structure.

10. The process of claim 6 or 7 wherein the porous structure is formed of an open pore structure.

11. The process of claim 10 wherein the second surface of the porous structure further has a fibrous cloth adherent thereto.

* * * * *